Dec. 5, 1967     E. F. DRECHSLER     3,355,798
MACHINE TOOL WITH A TOOL CHANGER
Filed July 27, 1966     5 Sheets-Sheet 1

FIG 1

INVENTOR.
ERICH F. DRECHSLER
BY Robert C Jones

Dec. 5, 1967     E. F. DRECHSLER     3,355,798
MACHINE TOOL WITH A TOOL CHANGER
Filed July 27, 1966     5 Sheets-Sheet 4

INVENTOR
ERICH F. DRECHSLER
BY
Robert C. Jones

United States Patent Office 3,355,798
Patented Dec. 5, 1967

3,355,798
MACHINE TOOL WITH A TOOL CHANGER
Erich F. Drechsler, Milwaukee, Wis., assignor to Kearney & Trecker Corporation, West Allis, Wis., a corporation of Wisconsin
Filed July 27, 1966, Ser. No. 568,335
9 Claims. (Cl. 29—568)

ABSTRACT OF THE DISCLOSURE

A tool storage magazine is indexable about a vertical axis and carries three turrets, each of which are independently rotatable relative to the magazine about horizontal axes. The independent movement of each of the turrets serves to move the tools carried in each turret past a reader so that a desired tool which may be located in any one of the turrets may be selected and located in tool change position. The indexing movement of the magazine will locate the particular turret in which the selected desired tool is stored at the tool change station.

---

It is a general object of this invention to provide a machine tool with a tool changer mechanism having a large capacity tool storage magazine that is adapted to be used for storing tools in varying sizes and diameters.

Another object of this invention is to provide a tool changer mechanism having a tool storage magazine of increased capacity which is particularly suitable for storing large diameter tools and small diameter tools which are to be selectively used on the operating station of a machine tool.

Still another object of this invention is to provide a tool changer mechanism having a multiple turret tool storage magazine.

A further object of this invention is to provide a tool changer mechanism having a tool storage magazine that is provided with a plurality of tool storage turrets which are movable relative to the storage magazine in a tool selecting operation and are bodily movable with the magazine for selectively positioning the turret with the selected tool at a tool change station.

Yet another object of this invention is to provide a tool storage magazine having a plurality of tool storage turrets which are rotatable relative to the magazine for identifying and selecting a tool to be used in the operating station of a machine tool and that are bodily movable with the magazine for locating the selected tool in a ready position at a tool change station.

According to this invention, there is provided an improved and simplified tool changer mechanism for selectively changing diverse tools that are used in a spindle of a machine tool. The machine tool includes a movable tool storage magazine having a plurality of stored tools and a tool changer member that is carried in bodily spaced relationship relative to the tool storage magazine and the spindle or tool operator. The tool changer is operative to effect an interchange of tools between the storage magazine and the spindle.

The tools are stored in a plurality of storage turrets which are supported by the magazine for rotation relative to the magazine in a tool selecting operation. For identifying and selecting a designated tool, each turret has an associated tool sensor or reading head which, as the turrets rotate, are in a position to identify the tools in an associated turret as the tools move in with the turrets in their path of travel. When a designated tool is identified and selected by one of the tool reading heads, the rotational movement of all turrets is stopped with the selected tool being located in a predetermined position for subsequent movement into a tool ready position at a tool change station wherein the selected tool is positioned adjacent the tool transfer member for subsequent engagement and transfer to the operating station of the machine tool. This positioning movement is accomplished by rotating the magazine, thereby effecting the bodily movement of the turrets. When the turret with the designated selected tool is positioned at the tool change station, the rotation of the magazine is stopped. The magazine is then locked in position to retain the selected tool in a position adjacent the tool changer member for subsequent engagement and transfer to the spindle. Thus, the independent rotation of the turrets serve to identify and select a designated tool and the subsequent operational movement of the magazine serves to selectively position the turret with the selected tool in a ready position at the tool change station where it can be engaged and transferred to the operating station of a machine tool by a tool transfer member.

The foregoing and other objects of this invention, which will become more fully apparent from the following detailed description, may be achieved by the exemplifying apparatus depicted and set forth in the specification in connection with the accompanying drawings, in which:

GENERAL MACHINE ARRANGEMENT

Figure 1:
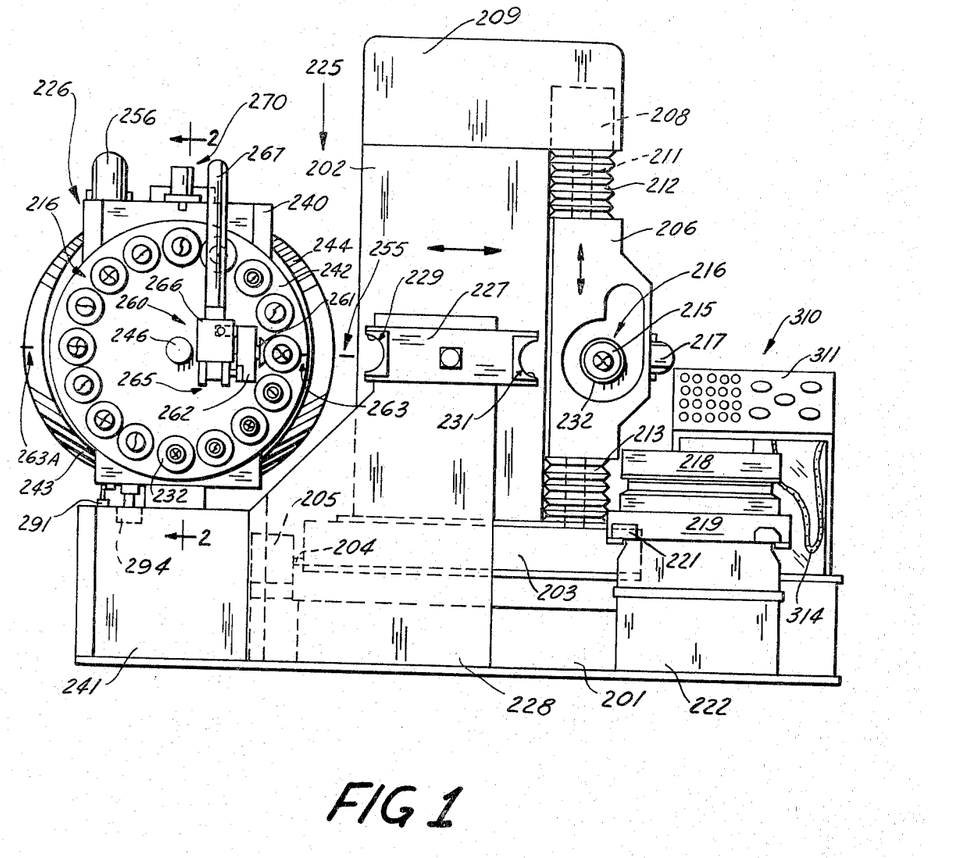
FIGURE 1 is a view in front elevation of a machine tool incorporating the features of the present invention.

Reference is now made more particularly to the drawings, and specifically to FIG. 1 thereof, illustrating a machine tool incorporating the features of the present invention. The machine comprises generally a bed 201 which slidably supports an upstanding column 202 having a base 203. The bed 201 is provided with horizontal way surfaces 204 which are engaged by complementary way surfaces [not shown] formed on the bottom of the column base 203 to support the column for sliding movement along the lengths of the bed 201. Horizontal movement of the column in either direction is effected by operation of a motor 205 which is connected to drive a screw [not shown] engaged in a nut [not shown] that is secured to the undersurface of the column base 203. The column 202 is provided with vertical way surfaces [not shown] for slidably supporting a spindle head 206 for movement in a vertical path of travel. Vertical movement of the spindle head 206 in either direction is effected through the operation of the motor 208 mounted within a column cap 209 which, in turn, is mounted on the top surface of the column 202 and is arranged to overhang the column. The motor 208 is operatively connected to drive a screw 211 which is in threaded engagement with a recirculating ball bearing nut [not shown]

that is secured within the spindle head 206. The screw 211 is rotatably supported by the column 202, being journaled in suitable bearings [not shown] that are disposed within the column base 203. The exposed upper and lower ends of the screw 211 are protected from damage by means of expansible double type coverings 212 and 213 as shown.

The spindle head 206 constitutes the operating station of the machine tool and rotatably supports a spindle 215 which is operable to receive a tool 216 to rotate with the spindle, the tool being operatively maintained within the spindle by means of the usual collet mechanism [not shown]. The spindle 215 is rotated by a suitable motor 217 that is carried on the side of the spindle head 206.

The spindle 215 supports the tool 216 in position to operate upon the workpiece [not shown] which may be secured in well-known manner on the indexing table 218 that, in turn, is mounted on the movable saddle 219. The saddle 219 is supported for transverse sliding movement towards and away from the column 202 along way surfaces 221 provided on the top surface of a laterally extending auxiliary bed 222.

The machine tool illustrated is equipped with an automatically operable tool changer mechanism 225, generally comprising a tool storage magazine 226 and a tool transfer member or arm 227. The arm 227 is supported for axial movement towards and away from the column 202 and also for rotational movement to transfer tools between the tool storage magazine 226, in which a plurality of diverse tools 216 are stored, and the spindle 215. The tool change arm 227 is supported by an upstanding frame member 228 that is attached to the bed 201 of the machine. The arm 227 serves to transport the tools between the magazine and the spindle, and simultaneously therewith, transfers a tool from the spindle to the magazine for storage. When a tool change is to be effected, a pair of grips 229 and 231, provided in the arm 227 and having substantially semi-circular surfaces for receiving a collar 232 that is provided on each of the tools 216, are extended in opposite directions relative to each other into tool engaging positions.

Magazine

The magazine 226, in which a plurality of diverse tools are stored, comprises an upstanding frame 240 which is supported for bodily rotation about a vertical axis adjacent to the column bed 201. To this end, the magazine frame 240 is supported on upper and lower antifriction bearings 234 and 235 which, in turn, are mounted in spaced relationship on a vertical post 236. The post 236, in turn, is fixedly supported on a base 241 which, in this particular illustration, is a part of the bed 201. Thus, the frame 240 is rotatable about the vertical axis of the fixed post 236.

Figure 2:
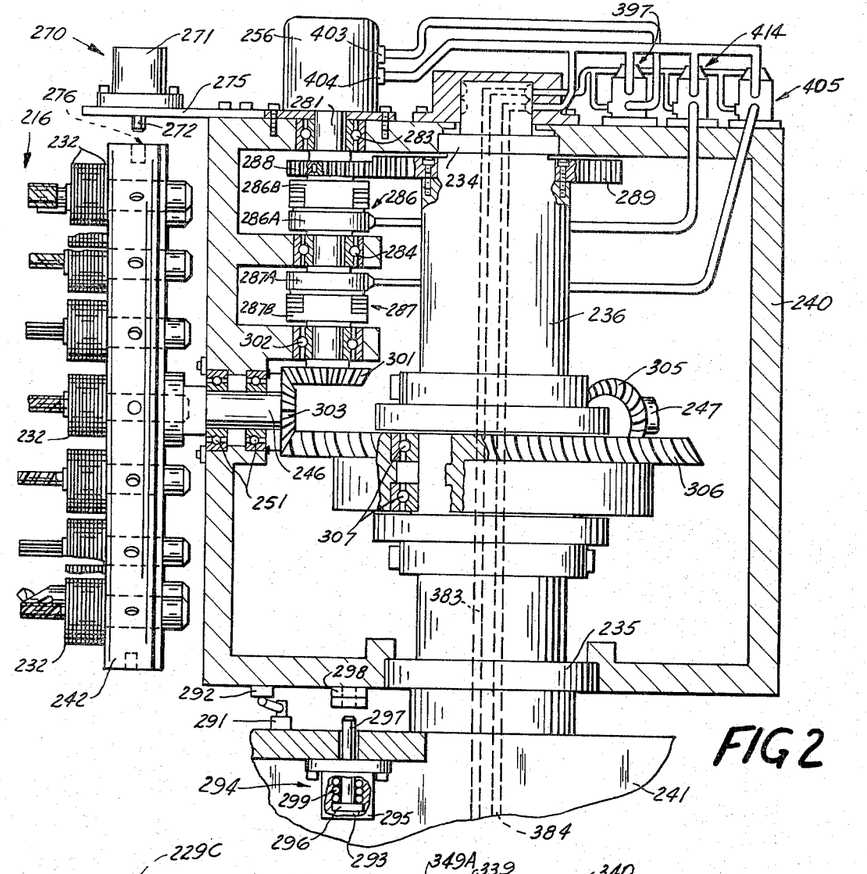
FIG. 2 is a view partly in elevation and partly in vertical section taken along the plane represented by the line 2—2 in FIG. 1.
Figure 3:
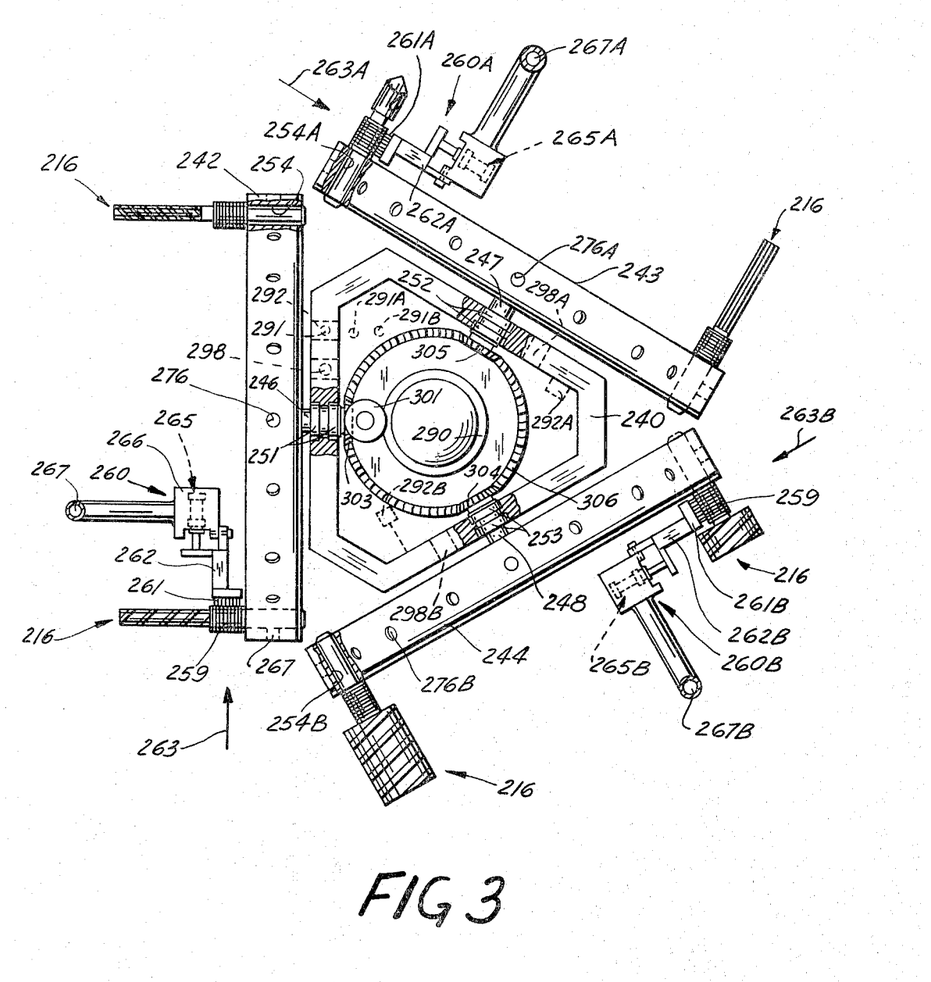
FIG. 3 is a view in horizontal section through the tool storage magazine showing the drive arrangement for simultaneously driving the plurality of tool storage turrets in a tool selecting operation.

The frame 240 is adapted to support a plurality of tool storage turrets 242, 243 and 244, which are supported for bodily movement with the frame and for independent rotation relative to the frame. To this end, as shown in FIGS. 2 and 3, the frame 240 is provided with shafts 246, 247 and 248 which are carried thereby in angular equally spaced relationship in a horizontal plane with each shaft being journaled to rotate in the frame 240 in bearings 251, 252 and 253 respectively. Each of the shafts 246, 247 and 248 supports a turret 242, 243 and 244 respectively, which are secured to the shaft so as to rotate therewith. Each of the turrets is adapted to support a plurality of tools 216 in storage, and thus, is provided with a plurality of tool storage sockets 254 that are adapted to carry the several tools 216 in storage therein.

Rotational movement of the storage magazine 226 for selectively positioning a particular turret in front facing relationship, as depicted by the position of the turret 242 in FIG. 1, so that a selected tool will be located in a ready position at a tool change station 255, is effected by means of a motor 256 that is carried on the top of the frame 240. With the particular arrangement of the magazine shown, the number of tools that may be carried in storage is increased at least threefold without materially increasing the size of the individual turrets. Thus, without sacrificing valuable floor space, the tool storage capacity of the magazine is increased so that the number of operations that may be performed by the machine tool on workpieces is increased.

In the present instance, each of the tools 216 is identified by a number and is coded in accordance with the binary system to indicate the number of the tool. As is well-known in the art, in the binary system each digit of the binary number is either "OFF" as indicated by a "0," or "ON" as represented by a "1." In the present illustrated embodiment, ten digits of the binary system is utilized so that 512 tools can be identified. Thus, ten peripheral strips about the collar 232 of the tool 216 are provided and are designated to constitute coding, each of the strips representing one of the digits of the binary system in the present example. Each of these peripheral strips may be provided with a peripheral land or ring to indicate the numeral "1" for that particular digit of the binary number; and, in the absence of a peripheral ring along any of the peripheral strips indicates the numeral "0" for that particular digit of the binary system. For a more detailed description of the coding structure, reference may be had to Patent No. 3,052,011 issued to Wallace E. Brainard et al.

Reading head

The coding on the tool 216 is read by a tool selector or reading head generally identified by reference numeral 260, which is shown in FIGS. 1 and 3. Since there are three individual turrets, 242, 243 and 244, each turret is provided with individual reading heads, 260, 260A and 260B, respectively, and all reading heads are identical. Prior to actuating the motor 256 for rotating the turrets 242, 243 and 244, the identification number of the desired tool, which may be in any one of the turrets, is impressed upon the electrical control system either manually or automatically. Then, as the turrets are rotated, the tool reading heads will read the code on the collars 232 of each of the tools stored in the associated turret as the tools are moved past the individual reading heads by the rotation of the turrets. When a number read on the collar of one of the tools by a particular reading head 260, 260A or 260B coincides with the number impressed upon the electrical control system, the electrical control system will operate to stop the rotation of the turrets.

The tool reading heads are identical, and therefore, the general description of one will apply to all. As shown in FIG. 3, the reading head 260 includes a plurality of movable fingers 261 that extend from a housing 262 into engagement with the strips or rings 259 on the collar of the tool 216 that have been designated to contain the coding for identifying each tool. The actuation of the various fingers 261 by the rings 259 of the tools 216 as the tools move past their respective reading heads, will move the fingers 261 inwardly within the housing for actuating switches [not shown] in different combinations, these switches constituting tool selection switches that are a part of the tool selection circuit.

In FIG. 3, the reading head 260 is shown in a forward advanced position to engage its associated fingers 261 with the rings 259 of the tools 216. When the desired tool is selected, it will be located in a horizontal selected tool position, which is the position of a tool that is located to the right of the turret axis and in the horizontal plane which passes through the axis of the turret, as viewed facing the turret 242, and generally indicated by the reference numeral 263. With the desired tool selected, the associated reading head must be retracted to withdraw the fingers 261 out of engagement with the code rings 259 to allow the tool to be extracted and inserted into the storage sockets of the storage turret. To this end, the reading head housing 262 is supported on a bracket 266 for pivotal movement to and away from a tool. The bracket 266 is carried on the inwardly extending end of a tubular U-shaped arm member 267, the upper end of which extends over the associated turret and is secured to the top of the frame 240. The tubular U-shaped bracket member 267 is constructed in a manner to provide sufficient clearance for the end of the longest tool to be carried in storage in the various turrets as the tools move in a rotational path of travel with their associated turret.

Since a succeeding designated tool to be used in the spindle 215 of the machine tool may be any one of the tools carried in storage in any one of the turrets 242, 243 and 244, each turret has a selected tool position 263, 263A and 263B respectively. A selected tool in the selected tool position 263, 263A or 263B of the turret in which it may be stored, will be located in the same horizontal plane in which the tool grips 229 and 231 of the arm 227 are located. Thus, upon the subsequent movement of the turret with the selected tool into the front facing position, as exemplified by the position of the turret 242 in FIG. 1, the selected tool will be positioned in the ready position at the tool change station 255, where it is available for transfer to the spindle 215 by operation of the tool transfer arm 227. The pivotal movement of the reading head into forward advanced position, or into a retracted position, is effected by means of a fluid actuator 265 that is also carried by the bracket 266 at the lower end thereof and which has its piston rod attached to the lower end of the housing 262, as indicated in FIG. 1.

Turret positioning control

Figure 5:
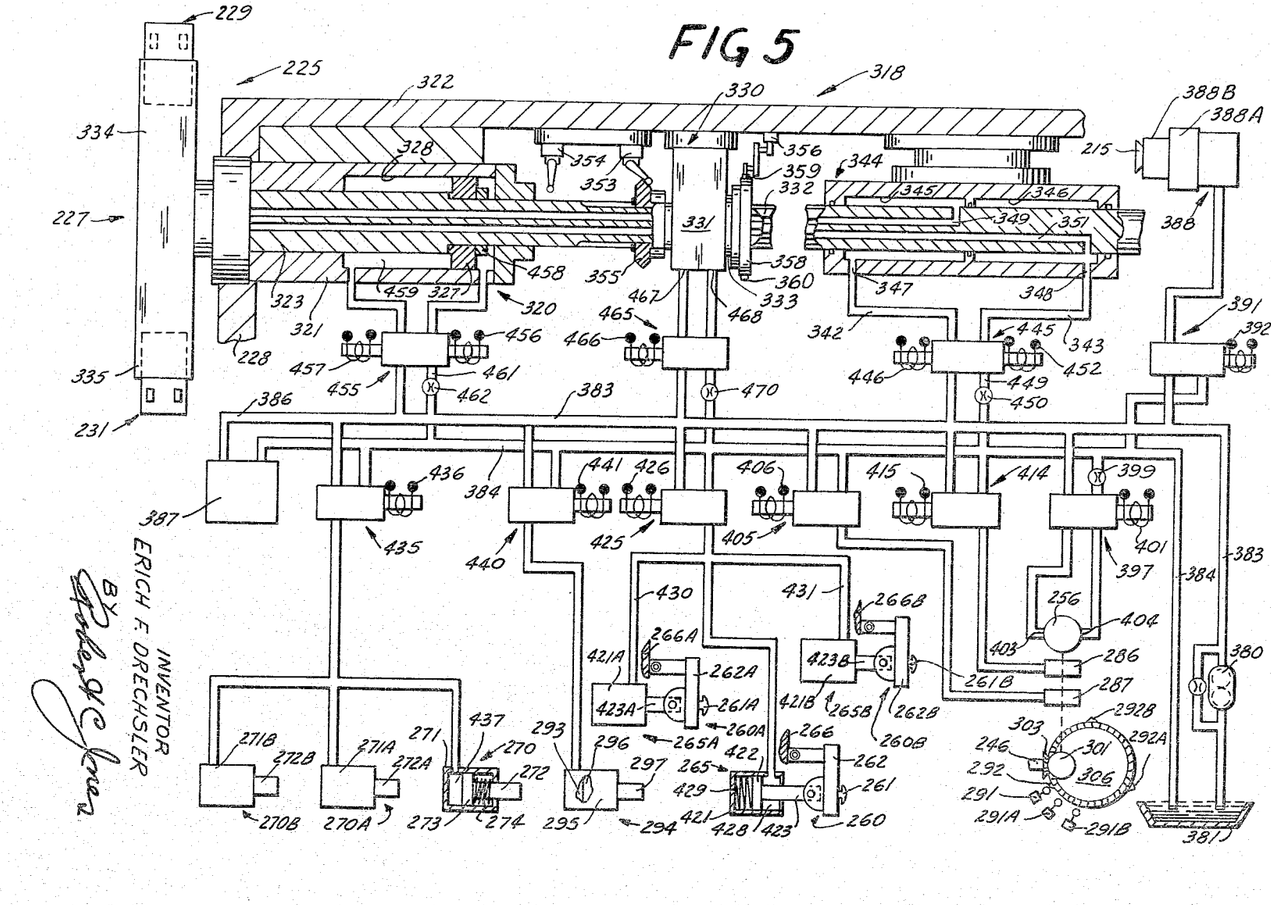
FIG. 5 is a composite illustration of a detail view partly in side elevation and partly in vertical section illustrating the tool change arm and operating mechanism therefor is shown in conjunction with a diagrammatic view of the hydraulic circuit; and, FIG. 6 is a schematic wiring diagram illustrating the electrical control circuit for controlling the operation of the various components in a tool selecting and a tool change cycle of operation.

The precise positioning of the turrets for accurately locating the selected tool 216 in a turret, for example the turret 242, at the selected tool position 263 thereof is achieved by means of shot bolt mechanisms 270, shown in FIG. 2 and diagrammatically in FIG. 5. Generally, the positioning mechanism or shot bolt mechanism 270 comprises a cylinder 271 having an axial movable shot bolt 272 which is secured to a movable piston 273 reciprocally supported within the cylinder 271. The shot bolt mechanism 270 is supported on a bracket 275, which is secured to the top surface of the frame 240, and is arranged to extend outwardly over the turret in position so that the shot bolt 272 may engage in any one of the openings 276 formed in the turret in the peripheral edge thereof which are individually associated with the storage sockets provided in the turret. Whenever a selected tool is located in the horizontal selected tool position 263, fluid pressure is supplied to the cylinder 271, at the head side of the piston 273 therein, to move the shot bolt 272 outwardly into engagement with an axially aligned opening associated with a storage position in the magazine. In the particular illustration shown, the shot bolt mechanism is located in a vertical plane, and since the selected tool position 263 is in the horizontal plane, the shot bolt 272 engages in a locating opening 276 which is associated with a particular storage position that is located 90° from the storage position in which the desired tool is located. In this manner, the precise positioning of the selected tool at the selected tool position 263 is assured and the turret is locked in position so that the desired tool will be disposed in the same horizontal plane in which the tool grip of the arm 227, adjacent the storage magazine 226, is disposed. Therefore, when the particular turret has been bodily rotated into front facing position, the selected tool will be positioned in the ready position at the tool change station 255. Whenever the shot bolt mechanism 270 is operated to lock the turret in position, it also serves to signify that movement of the magazine 226 may be initiated to position the turret in a front facing position thereby positioning the selected tool in the ready position at the tool change station 255 directly across from the adjacent grip, such as the grip 229 presented by the tool change arm 227.

Shot bolt mechanisms 270A and 270B, diagrammatically illustrated in FIG. 5, are provided for the turrets 243 and 244, and are similar to the shot bolt mechanism 270 in construction, arrangement and operation. The shot bolt mechanisms 270A and 270B will be operated simultaneously with the shot bolt mechanism 270 and will operate to stop the rotation of their associated turrets 243 and 244 respectively.

Magazine drive

As previously mentioned, the magazine 226 is rotated to selectively position one of the turrets 242, 243 or 244 in front facing position for locating the selected tool in ready position at the tool change station 255. To this end, the motor 256, carried by the frame 240, is selectively connectible to effect the rotation of the magazine 226 to thereby effect bodily movement of the turrets. As shown in FIG. 2, the motor 256 is connected to drive a shaft 281 which extends downwardly into the frame 240, being journaled therein in antifriction bearings 283 and 284 that are carried by the frame 240. Operatively arranged on the shaft 281 is a magazine drive clutch mechanism 286. The clutch mechanism 286 has an associated driving member 286A secured to the motor driven shaft 281 in a manner to rotate with the shaft 281 as it is driven by the motor 256. A driven element 286B of the clutch mechanism 286 is supported for rotation relative to the shaft 281 and has secured to it a gear 288. The gear 288, in turn, is disposed in meshing engagement with a large bull gear 289 that is mounted on and secured to the vertical upwardly extending post 236 on which the frame 240 is supported for rotation. Whenever the clutch 286 is operated, the driving member 286A of the clutch is coupled to the driven member 286B thereof which, in turn, operates to couple the gear 288 to the motor drive shaft 281. Thus, with the motor 256 operating, the gear 288 will be rotated, and since the bull gear 289 is secured to the post 236, the gear 288 will rotate in an orbit around the bull gear thereby effecting the bodily rotational movement of the frame 240 and its associated mechanism about the post 236. Thus, the turrets 242, 243 and 244 are bodily rotated with the rotation of the magazine 226.

When the magazine 226 has been rotated to locate a particular turret in which the selected desired tool is stored, such as the turret 242, in a front facing position thereby locating the selected tool in the ready position at the tool change station 255, a dog 292, carried on the undersurface of the driven end of the magazine frame 240, will be moved into a position to engage and actuate a limit switch 291 that is carried on the upper surface of the base 241. Actuation of the limit switch 291 will provide a signal to indicate in the electrical control circuit that the turret 242, in which the selected tool is stored, is in front facing position and the selected tool is in the ready position at the tool change station 255. It is to be understood that a similar arrangement is provided for the turrets 243 and 244. As diagrammatically indicated in FIG. 5, dogs 292A and 292B associated with the turrets 243 and 244 respectively, will actuate associated limit switches 291A and 291B respectively, whenever one or the other of the turrets 243 or 244 has the selected tool in storage and is in front facing position. Thus, when any one of the turrets 242, 243 or 244, having a selected tool in the selected tool position thereof, is located in the front facing position, one or the other of the limit switches 291, 291A or 291B will be actuated by an associated dog 292, 292A or 292B respectively.

It will be assumed that the turret 242 has the selected tool which is to be located at the tool change station 255 for the next tool change operation and that the desired tool has been identified and located at the selected tool position 263. Under this condition, the shot bolt mechanism 270 will be energized so that the shot bolt 272 will engage in an aligned opening 276 to lock the turret with the selected tool in the horizontal selected tool position 263. Simultaneously, the shot bolt mechanisms 270A and 270B will be operated to stop the rotation of their associated turrets and lock them in a stopped position. With the succeeding tool selected, the clutch 286 will be operated and the motor 256 will operate to drive the frame 240 of the magazine 226. When the frame 240 has been rotated so as to position the turret 242 in the front facing position to thereby locate the selected tool at the tool change station 255, the limit switch 291 will be actuated by the dog 292 associated with the turret 242 and a signal will be obtained to effect the operation of a magazine shot bolt mechanism 294 to lock the magazine in position.

The shot bolt mechanism 294, shown in FIG. 2, is similar to the turret shot bolt mechanism 270 and generally comprises a cylinder 295 in which a piston 296 is reciprocally supported. A shot bolt 297 is attached to the piston 296 so as to be forced outwardly into engagement with a locating block 298 carried in the undersurface of the magazine frame member 240 and associated with the particular turret 242. Whenever a signal is obtained to signify that the turret carrying the selected desired tool is located in the ready position at the tool change station 255, fluid pressure will be supplied to the head end of the piston 296 forcing the shot bolt 297 outwardly into engagement in the block 298. To release the magazine for rotation, fluid pressure is discontinued to the head end of the cylinder 295 and an internal spring 299, operatively disposed around the shot bolt 297 on the rod side of the piston 296, operates to move the piston 296 inwardly into the cylinder, or downwardly as viewed in FIG. 2, drawing the shot bolt 297 out of engagement with the block 298 to release the magazine frame 240. The switches 291, 291A or 291B when actuated will also effect the deenergization of the magazine clutch 286 to interrupt the drive connection between the motor 256 and the gear 288. Thus, the magazine rotational drive is interrupted simultaneously with the operation of the shot bolt mechanism 294.

Turret drive mechanism

As previously mentioned, the turrets 242, 243 and 244 are simultaneously rotated relative to the magazine frame 240 in a tool selecting movement so as to move the respective tools past the respective reading heads for identification and selection of a designated tool. The simultaneous rotation of the turrets is effected by means of a bevel gear 301 which is journaled in a bearing 302 and carried in a laterally extending web member of the magazine frame 240. The bevel gear 301 is operatively connected to a driven member 287B of a turret drive clutch mechanism 287. On the other hand, the driving member 287A of the clutch mechanism 287 is secured to the motor shaft 281 and rotates with the shaft 281. Whenever the clutch mechanism 287 is actuated, the driving member 287A is coupled to the driven member 287B which, in turn, effects the rotation of the bevel gear 301. As shown in FIGS. 2 and 3, the bevel gear 301 is disposed in meshing engagement with a bevel gear 303 which is secured on the inner end of the shaft 246 that is constructed and arranged to support and rotate the turret 242. The turret bevel gear 303 is disposed in meshing engagement with a large bevel gear 306 which is supported on bearings 307 carried on the stationary center post 290. The arrangement is such that the bevel gear 306 is free to rotate relative to the post 290 whenever it is driven through the bevel gears 301 and 303. A similar arrangement is provided for the turrets 243 and 244 with the exception that there is no driving bevel gear associated therewith. Thus, the inner end of the drive shaft 247, that is connected to rotate the turret 243, is provided with a bevel gear 305 which is disposed in meshing engagement with the bevel gear 306. In like manner, the drive shaft 248, which carries and rotates the turret 244, is provided with a bevel gear 304, FIG. 3, which is also disposed in meshing engagement with the bevel gear 306. It is apparent, therefore, that whenever the clutch mechanism 287 is engaged, the bevel gear 301 will be driven by the motor 256, and in turn, will drive the bevel gear 303 which operates to drive its turret 242. Simultaneously, the bevel gear 303 will also drive the large bevel gear 306 so that the drive is imparted to both of the bevel gears 304 and 305 to thereby effect the rotation of the turrets 244 and 243 simultaneously with the rotation of the turret 242.

Whenever one of the reading heads 260, 260A or 260B, associated with the turrets 242, 243 or 244, respectively, identifies and selects a designated tool, the turret shot bolt mechanisms 270, 270A and 270B, associated with the turrets, will be energized to simultaneously stop the rotation of the turrets, and the turret, carrying the desired tool, will be positioned so that the selected tool is in a horizontal selected tool position. Simultaneously, with the energization of the shot bolt mechanisms 270, 270A and 270B, the clutch mechanism 287 will be deactuated thereby interrupting the drive to the turrets. With the turret driven clutch 287 deactuated, the magazine drive clutch 286 is actuated so that the motor 256 operates to effect the rotation of the magazine 226 for bodily moving the turrets to locate the turret with the selected tool in a front facing position locating the selected tool in the ready position at the tool change station 255. With the turret, in which the selected tool is stored, located in front facing position, one or the other of the limit switches 291, 291A or 291B will be actuated, and the magazine shot bolt mechanism 294 will be operated to lock the magazine in position.

When the selected tool has been interchanged with the previously used tool in the spindle, a signal will be obtained to effect the deactuation of the previously operated turret shot bolt mechanisms 270, 270A and 270B, to thereby retract the associated shot bolts. With the turret shot bolts all in retracted positions, the turret drive clutch 287 will be again actuated so that the motor 256 will again be operably connected to drive the turrets simultaneously in a tool selection operation. At this time, the magazine shot bolt 294 is maintained in engaged position to maintain the magazine 226 in a stationary position during a tool identification and selection operation. After a tool selection has been accomplished and the turrets locked in position, the magazine shot bolt 294 is deactuated to release the magazine 226. Simultaneously, the turret drive clutch 287 is deactuated and the magazine drive clutch 286 is actuated so that the magazine 226 is rotated to selectively locate the particular turret in which the selected tool is stored in the front facing position, as previously described.

Tool changer

The tool or transfer arm 227 is supported for horizontal movement in a direction to and away from the column 202 for the purpose of inserting and withdrawing tools from the magazine and from the spindle simultaneously. The arm 227 is also rotatable about its axis for effecting the interchange of the tools withdrawn from the magazine and the spindle so that the previously used tool may be returned to the magazine for storage while the tool withdrawn from the magazine may be placed in the spindle for the next preceding work operation. As depicted in FIG. 1, the tool transfer arm 227 is maintained in a horizontal and retracted position relative to the magazine 226 and to the spindle 215. When the tools are to be interchanged, the grips 229 and 231 are extended laterally so that the grips are moved into engagement with the adjacent tools; i.e., the grip 229, as viewed in FIG. 1, will be moved into engagement with a tool in the ready position at the tool change station 255, while the grip 231 will be moved laterally toward the spindle 215 to engage the tool presented by the spindle. Thereafter, the arm 227 will be operated in its several movements to effect a tool interchange operation.

As previously mentioned, the tool transfer arm 227 is carried on the upstanding frame 228 and is actuated in its several movements in a tool change operation by means of a hydraulic unit 318 also carried by the frame 228 and which is shown in detail in FIG. 5. Operation of the tool change arm 227 to effect the withdrawal or insertion of tools out of or into the storage magazine 226 and the spindle 215 is accomplished through the operation of a hydraulic actuator 320 of the unit 318. As shown in FIG. 5, the hydraulic actuator 320 comprises a cylinder 321 which is disposed in a suitable opening formed in the frame 228 and secured to the undersurface of the top 322 of the frame 228. A piston rod 323 extends through the cylinder 321 and is supported therein for rotational and axial movement. A piston 327 is secured to a reduced portion of the rod 323 and is disposed to reciprocate within an enlarged bore 328 provided in the cylinder 321 to effect the axial movement of the rod 323. The tool transfer arm 227 is supported on the outer or leftwardly extending end of the piston rod 323, being secured thereon in a manner to rotate with the rod 323 and also to move axially with the rod. Thus, axial leftward movement of the piston 327 within the bore 328 will effect the leftward or outward movement of the rod 323 which, in turn, effects the movement of the arm 227 in a direction to extend it or move it away from the front face of the column 202. In this movement, the arm will operate to withdraw a tool from the spindle and also to withdraw the selected tool from the ready position at the tool change station 255 from its storage position in the magazine. On the other hand, the rightward movement of the piston 327, to return it to the position it occupies in FIG. 5, will effect the retraction or inward movement of the arm 227. In this movement, the arm 227 will operate to insert a tool in the storage socket located in the ready position at the tool change station 255 and also to insert a tool into the spindle 215.

As previously mentioned, the arm 227 is adapted to be rotated in a clockwise direction 180° in a tool interchange operation. It is to be understood, that the arm 227 is capable of being rotated a complete 360°. However, in a single tool change cycle of operation, the arm rotates only 180° so that in the first tool change operation, the positions of the grips 229 and 231 are interchanged wherein the grip 229 will be positioned adjacent to the spindle, while the grip 231 will be positioned adjacent to the magazine 226. On the second tool change cycle of operation, the arm 227 will again be rotated 180° in a clockwise direction to reposition the grips 229 and 231 so that they are returned to their original positions, as depicted in FIG. 1. It is apparent, therefore, that a complete 360° of rotation of the arm is effected upon completion of two tool change cycles of operation.

Rotation of the arm 227 in a tool change cycle of operation is effected while the arm is in extended position and with the grips 229 and 231 in their retracted positions, as depicted in FIG. 1. In this position of the arm, assuming that the arm has engaged and withdrawn tools from the magazine and spindle, the tools which will be carried by the grips 229 and 231 will be located inwardly towards the axis of the tool change arm so that the tool in the grip 229 will be free and clear of the other tools in the turret 242. Thus, upon rotation of the arm 227 in a tool interchange movement, the rotary movement of the tools with the arm will not be impeded by the tools presented by the front facing magazine, such as the turret 242.

Rotation of the arm in a 180° of tool interchange movement is effected by means of a hydraulic motor 330. The motor 330 includes a housing or frame 331 which is secured in operative position to the undersurface of the top plate 322 of the frame 228, shown in FIG. 5. The rearwardly extending end 332 of the piston rod 323 is splined and extends through and engages with the internally splined output shaft 333 of the motor 330 in a manner to form an operative rotatable drive connection between the motor output shaft 333 and the piston rod 323 with the drive connection being maintained in any axial position to which the piston rod 323 may be moved.

Figure 4:
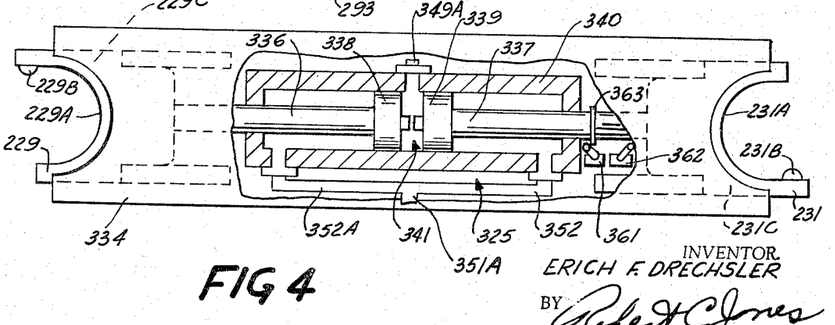
FIG. 4 is an enlarged view in front elevation of the tool change arm with parts broken away to show the drive mechanism for effecting the extension and retraction of the tool grips.

The arm 227 comprises a hollow housing 334 which is closed by means of a cover 335. In FIG. 4, the cover 335 has been partially broken away to show the mechanism for extending and retracting the grips 229 and 231. The grips 229 and 231 are essentially the same, comprising outwardly disposed semi-circular cup members 229A and 231A, respectively, which are disposed to engage the collar portion 232 of the tools 216. The grips 229 and 231 are each provided with resilient outwardly biased detents 229B and 231B, respectively, which serve to releasably secure the tools in the grips. The semi-circular cup members 229A and 231A of the grips 229 and 231, respectively, are each secured to the outwardly extending ends of slides 229C and 231C, respectively secured to piston rods 336 and 337. The piston rods 336 and 337 are, in turn, secured to pistons 338 and 339 which are supported for reciprocal movement in a cylinder 40 that is operatively carried within the arm housing 334 intermediate the ends thereof.

To effect the extension of the grips 229 and 231, pressure fluid is supplied to the interior of the cylinder 340 to a chamber 341 formed by the pistons 338 and 339 and the cylinder 340. Pressure fluid to the chamber 341 will force the pistons outwardly towards the ends of the cylinder thereby moving their associated grips 229 and 231 to their extended positions and into engagement with a tool in the ready position at the tool change station 255 and also with a tool presented by the spindle 215. On the other hand, to retract the grips 229 and 231, pressure fluid is supplied simultaneously to both ends of the cylinder 340, thereby moving both pistons 338 and 339 inwardly towards the center of the cylinder 340 and moving the grips 229 and 231 to their retracted positions.

Pressure fluid is supplied to the cylinder 340 via conduits or lines 342 and 343, FIG. 5, that are connected to a stationary manifold 344 which is secured to the undersurface of the top plate 322 of the frame 228. The manifold 344 is mounted about the rightwardly extending end of the rod 323 and is provided with two elongated circular chambers 345 and 346 with which the lines 342 and 343, respectively, communicate via interconnecting manifold passages 347 and 348, respectively. Pressure fluid from the line 342 to the manifold chamber 345 will flow into a communicating drilled passages 349 formed in the rod 323 which, in turn, is connected to the chamber 341 in the grip actuator cylinder 340 via a flexible line 349A, FIG. 4. On the other hand, to retract the grips 229 and 231, pressure fluid from the line 343 is supplied to the manifold chamber 346 and will flow into a communicating drilled passage 351 also formed in the rod 323. The passage 351 is, in turn, connected to a flexible line 351A which, in turn, is connected to supply pressure fluid simultaneously to both ends of the grip actuator cylinder 340 via interconnected communicating lines 352 and 352A. With the arrangement shown, the hydraulic connections for actuating the grips 229 and 231 in either an extending or a retracting movement is maintained in any axial or rotary position to which the arm 227 may be positioned.

Thus, the arm 227 may be bodily moved in an extending movement away from the column 202, or may be moved in a retracting movement toward the column, through the operation of the hydraulic actuator 320. During the extension of the arm 227, the rotational drive connection between the rod 323 and the motor 330 is maintained by reason of the splined engagement between the rod 323 and the motor output shaft 333.

The completion of each movement of the tool transfer arm 227, as well as the position of the grips 229 and 231, is indicated in the electrical control system. The retracted and extended positions of the arm 227 are indicated in the control system by the actuation of limit switches 353 and 354, respectively, FIG. 5, when these positions of the arm have been established. As depicted in FIG. 5, with the arm 227 in retracted position, the limit switch 353 is actuated by a circular cam 355 which is mounted about the rod 323 and secured thereto for axial and rotational movement with the shaft. On the other hand, when the arm 227 has been moved to an extended position, the cam 355 will actuate the limit switch 354 regardless of the angular position of the arm.

The completion of each rotary movement of the tool transfer arm 227 is indicated by a limit switch 356, FIG. 5, which is mounted internally within the frame 228. The switch 356 is controlled by a cam plate 358 having a pair of switch actuating points or cams 359 and 360. As depicted in FIG. 5, the cam plate 358 is secured to the face of an external radial flange portion of the motor output shaft 333. Thus, as the motor 330 is operated to effect the rotation of the rod 323 for rotating the arm 227, the cam plate 358 will also be rotated so that the cams 359 and 360 will be rotated a like amount. Therefore, when the arm 227 is initially rotated 180° in the first tool change cycle of operation, the cam plate 358, and thereby the cam 359, will be rotated a like amount and the cam 359 will be moved out of engagement with the limit switch 356 thereby releasing the switch. With the arm 227 rotated 180°, the cam 360 will have been moved into engagement with the limit switch 356 to again actuate the switch. On the other hand, in a second tool change cycle of operation, the arm will be rotated another 180° in a clockwise direction so that it will be returned to the horizontal position depicted in FIG. 1, wherein the grip 229 is positioned adjacent the magazine 226 while the grip 231 is again positioned adjacent the spindle 215. In this second 180° of rotary movement, the cam 360 will be moved out of engagement with the limit switch 356 and, upon completion of the second 180° of rotary arm movement, the cam 359 will be moved into engagement and will actuate the limit switch 356 when the arm has completed the second full 180° of rotary movement.

To indicate in the electrical system the position of the grips 229 and 231, two limit switches 361 and 362 are provided, as depicted in FIG. 4. The limit switch 361 when actuated serves to indicate in the electrical control circuit that the grips are in a retracted position. On the other hand, the limit switch 362 when actuated will indicate in the electrical control circuit that the grips are in an extended position. Actuation of the grip position indicating switches is accomplished by means of circular cam 363 which is secured to the piston rod 337 associated with the grip 231 shown in FIG. 4.

*Hydraulic circuit*

The hydraulic circuit for effecting the operation of the various components described above is illustrated diagrammatically in FIG. 5 and comprises a pump 380 connected to draw hydraulic fluid from a reservoir 381. The output of the pump 380 is discharged into a pressure supply line 383 with the exhaust fluid being carried back to the reservoir by a main return line 384. The horizontal movement of the column 202 along the bed 201 is effected by the hydraulic motor 205 which is actuated by fluid pressure obtained from the main supply line 383 via branch line 386. The branch line 386, in turn, is connected to a hydraulic servo valve [not shown] that may be operated automatically in response to signals from recorded data obtained from the tape mechanism 310, or by the manual manipulation of the electrical control circuit for controlling the movement of the column 202, as desired. Similarly, the spindle head 206 is moved in its vertical path of travel by the operation of the hydraulic motor 208 which is likewise actuated by fluid pressure obtained from the branch supply line 386 and which is supplied to the motor under the control of another hydraulic servo valve [not shown] associated with the motor 208. The hydraulic servo valve [not shown], associated with the motor 208, may be operated automatically in response to signals from the recorded data, or by manual manipulation of the electrical control system, to effect the desired positioning movement of the spindle head. The spindle 215 is driven in its rotary movement by a hydraulic motor 217, that is under the control of an associated hydraulic servo valve [not shown] which is supplied with pressure fluid from the branch supply line 386 and which is controlled by signals obtained from the tape controlled circuit 310, or by manual manipulation of the control circuit. The motors 205, 208 and 217, with the associated hydraulic servo valves, are not specifically shown in the hydraulic circuit of FIG. 5, but are presented therein by the block 387 that is shown connected to the line 386.

In a tool change operation, the spindle 215 must be conditioned to permit the withdrawal and insertion of a tool therein. Thus, with the spindle located in a tool change position, the associated spindle mechanism 388, which includes a spindle brake mechanism 388A and a spindle collet actuator mechanism 388B, must be actuated to apply a brake to the spindle to stop its rotation, and to operate the collet mechanism 388B associated with the spindle for effecting a release of the tool carried thereby. The spindle mechanism 388 is actuated by pressure fluid under the control of a valve 391 which is operated by energizing an associated solenoid 392. With the solenoid 392 energized, the valve 391 is operated to direct pressure fluid obtained from the main supply line 383 to the spindle mechanism 388 to thereby actuate the brake mechanism 388A to apply a brake to the spindle 215 to stop the rotation of the spindle and also to operate the collect mechanism 388B to effect the release of the tool held in the spindle 215. On the other hand, when the solenoid 392 is deenergized, the valve 391 is returned to its normal position wherein the supply of pressure fluid is interrupted to the associated spindle mechanism 388 and it is connected to the main return line 384. Thus, with the solenoid 392 deenergized, the brake mechanism 388A is released, while the collet mechanism 388B is actuated to operate the collect for clamping a tool in the spindle.

Operation of the motor 256 for driving the turrets 242, 243 and 244 simultaneously, or for rotating the magazine 226, is under the control of a directional control valve 397. The valve 397 is normally positioned to connect both ports of the motor 256 to the main return line 384. The return fluid from the motor 256 flows through an adjustable flow regulating valve 399 which is set to control the rate of operation of the motor 256. To effect the operation of the motor 256, a solenoid 401 is energized to thereby operate the valve 397 so that it directs pressure fluid from the main supply line 383 to the inlet port 403 of the motor 256. Exhaust fluid from the motor 256 will flow out of an outlet port 404, and by operation of the valve, will flow through the regulating valve 399 and thence into the main return line 384 and return to the reservoir 381.

With the motor 256 operating, it may be selectively connected to drive the turrets 242, 243 and 244 simultaneously in a clockwise direction in a tool selecting operation, or it may be connected to drive the magazine 226 for effecting the bodily rotation of the turrets for locating a particular one of the turrets in a front facing position wherein a selected tool will be located at the tool change station 255. To connect the motor 256 for driving the turrets 242, 243 and 244 simultaneously in a tool selecting operation, the hydraulic clutch mechanism 287 must be engaged. Operation of the clutch 287 is under the control of a solenoid control valve 405. To operate the clutch 287 for connecting the motor 256 to drive the gear 301 and thereby the turrets 242, 243 and 244, a solenoid 406, associated with the valve 405, is deenergized and operates the valve to direct pressure fluid from the main supply line 383 through the valve into the clutch mechanism 287.

To disconnect the drive from the motor 256 to the turrets, the solenoid 406 is energized thereby operating the valve 405 so that it interrupts the flow of pressure fluid to the clutch 287 and connects the clutch mechanism to the return line 384 to thereby effect the release of the internal operating mechanism of the clutch so that the driving and driven elements 287A and 287B thereof are moved to disengaged positions.

On the other hand, when it is desired to effect the rotation of the magazine 226, the clutch 286 will be operated so that the gear 288 will be operatively driven by the motor 256. The clutch 286 is under the control of a solenoid actuated valve 414 which is operable upon deenergization of its associated solenoid 415 to direct pressure fluid from the supply line 383 to the clutch mechanism 286. The pressure fluid supplied to the clutch mechanism 286 will effect the engagement of its associated driving and driven elements 286A and 286B thereby connecting the motor 256 to drive the gear 288, and thereby the large bull gear 289, to effect the rotation of the magazine 226. To stop the rotation of the magazine 226, the solenoid 415 is energized and the valve 414 thereupon operates to connect the internal clutch mechanism to the reservoir 381 via the return line 384 whereby the internal spring mechanism [not shown] operates to effect the disengagement of the driving component 286A and the driven component 286B thereof.

As previously mentioned, the individual sensing or reading heads 260, 260A and 260B are pivotally movable into tool reading positions wherein the associated fingers or sensors 261, 261A or 261B are positioned so as to engage with the collars of the tools 216 stored in the individual turrets, or the heads may be retracted to non-interferring position so that the selected tool may be withdrawn from storage. The pivotal movement of the reading heads into advanced tool identifying positions or retracted positions are effected simultaneously by means of actuators 265, 265A and 265B, all of which are identical in operation and construction. A general description of the actuator 265 will suffice for all actuators, and as shown, the actuator 265, FIGS. 1 and 5, generally comprises a cylinder 421 in which a piston 422 is supported for reciprocal movement. The piston 422 is provided with a piston rod 423 which is pivotally connected to a bracket provided on the housing 262 of the reading head 260. Operation of the actuator 265 for advancing the reading head 260 into tool reading or identifying position, is under the control of a solenoid actuated valve 425. For advancing the reading head 260 into a tool reading position, a solenoid 426 is deenergized whereupon the valve operates to connect a chamber 428 in the cylinder 421 on the rod side of the piston 422 to the return line 384.

With the chamber 428 connected to the return line 384, a spring 429 operatively disposed in the opposite end of the cylinder 421 operates on the head end of the piston 422 causing it to move rightwardly relative to the cylinder. The rightward movement of the piston 422 will effect a like movement of the piston rod 423 thereby effecting the pivotable movement of the housing 262 in a counterclockwise direction, FIGS. 1 and 5. The counterclockwise pivotal movement of the housing 262 relative to the bracket 266 advances the reading fingers 261 so that they are positioned in the path of travel of the code rings 259 on the collars 232 of the tools 216 that are stored in the turret 242 and with which the reading head 260 is associated. In a similar manner, the actuators 265A and 265B, associated with the reading heads 260A and 260B, respectively, are also operated simultaneously with the operation of the actuators 265. Thus, the valve 425 also operates to connect the rod ends of the cylinders 421A and 421B of the actuators 265A and 265B, respectively, to the return line 384 via lines 430 and 431, respectively. Thus, internally disposed springs [not shown] operatively contained in the cylinders 421A and 421B and which are similar to the spring 429 of the cylinder 421, operate to effect the simultaneous advancement of the associated sensing fingers 261A and 261B into tool identifying position.

Assuming that the desired tool is stored in the turret 242 and has been identified and selected by the reading head 260 and is located in the selected tool position 263 of the turret 242, the reading head 260 must be retracted to disengage the fingers 216 from the code rings 259 on the collar of the selected tool so that the fingers do not interfere with the removal of the tool from the storage socket of the turret 242. To effect the pivotal retracting movement of the reading head 260, the solenoid 426 is energized and the valve 425 is operated to connect the chamber 428 to the pressure fluid supply line 383. The force which is imposed on the piston 422 by the pressure fluid in the chamber 428 will be greater than the force that the spring 429 imposes on the piston 422, and as a result, the piston 422 will be moved leftwardly within the cylinder 421, as viewed in FIG. 5, thereby effecting the clockwise pivotal movement of the housing 262 on the bracket 266, moving the fingers 261 out of engagement with the collar of the selected tool. As the pressure fluid is supplied to the actuator 265 to effect the retraction of the reading head 260, pressure fluid is also supplied to the actuators 265A and 265B simultaneously to effect the retraction of the reading heads 260A and 260B, respectively.

When the desired tool 216, which may be in any one of the turrets 242, 243 or 244, has been identified and selected and located in the selected tool position 263, 263A or 263B associated with the respective turrets, the rotation of the turrets is stopped and they are locked in the stopped position, with the selected tool accurately positioned in the selected tool position 263, 263A or 263B of the turret in which it is stored. As previously mentioned, the turrets 242, 243 and 244 are locked in position by means of the shot bolt mechanisms 270, 270A and 270B, respectively, which are operated simultaneously. The operation of the shot bolt mechanisms 270, 270A and 270B for stopping the rotation and for locking the turrets 242, 243 and 244 in the stopped position is under the control of a solenoid actuated valve 435. For advancing the shot bolts 272, 272A and 272B into engagement with aligned shot bolt receiving openings 276, 276A and 276B, formed in the peripheries of the turrets 242, 243 and 244, a solenoid 436 associated with the valve 435 is energized. With the solenoid 436 energized, the valve 435 is operated to direct pressure fluid from the main supply line 383 into a chamber 437 within the cylinder 271 at the left end thereof. The pressure fluid supplied to the chamber 437 will effect rightward movement of the piston 273 within the cylinder thereby effecting the rightward or outward movement of the shot bolt 272, as viewed in FIG. 5, or downwardly, as viewed in FIG. 2, into registration with the aligned opening 276. In a similar manner, the pressure fluid, which is supplied to the left end of the cylinders 271A and 271B, serves to effect the rightward movement of the shot bolts 272A and 272B, moving them into engagement with their associated turrets 243 and 244, respectively.

Prior to the rotation of the turrets in a tool selecting operation, the shot bolts 272, 272A and 272B must be retracted to free the turrets so that they may be rotated by the motor 256 in a tool selecting operation. To accomplish this, the solenoid 436 is denergized and the valve 435 is thereby operated to connect the chambers at the left ends of the cylinders 271, 271A and 271B to the main return line 384 thereby relieving the force that the pressure fluid exerted upon the piston 273 of the cylinder 271 and on the pistons [not shown] in the cylinders 271A and 271B. Under this condition, the spring 274 will operate to move the piston 273 leftwardly, withdrawing the shot bolt 272. Similarly, the shot bolts 272A and 272B are likewise retracted from engagement with their associated turrets 243 and 244, respectively.

Actuation of the magazine shot bolt mechanism 294, to position and lock the turret with the designated tool in the front facing position to locate the selected tool in the ready position at the tool change station 255, is under the control of a solenoid actuated valve 440. For advancing the shot bolt 297 into engagement with one of the locating blocks 298, 298A or 298B, depending upon which of the turrets has the selected tool, and therefore, which is to be locked in forward or front facing position, a solenoid 441 associated with the valve 440 is energized. With the solenoid 441 energized, the valve 440 is operated to direct pressure fluid from the main supply line 383 into a chamber 293 of the cylinder 295. Pressure fluid supplied to the chamber 293 of the actuator 294 will effect rightward movement of the piston 296, as viewed in FIG. 5, or upward movement of the piston, as viewed in FIG. 2, to thereby move the shot bolt 297 into locking engagement with one of the blocks 298, 298A or 298B associated with the turrets 242, 243 and 244, respectively.

Thus, assuming that the desired tool is stored in the turret 242, as soon as the reading head 260 has identified and selected the desired tool, the shot bolt mechanisms 270, 270A and 270B will be actuated to stop the rotation of the turrets and lock the turret 242 with the selected tool in the selected tool position 263. Thereupon, the magazine frame 240 will be rotated to bodily move the turret 242 into the front facing position depicted in FIG. 1. As the turret 242 is moved into front facing position, its associated cam 292 will actuate the switch 291. With the switch 291 actuated, the operation of the magazine shot bolt mechanism 294 will be effected to stop the rotation of the magazine and to lock the magazine frame 240 in a position wherein the turret 242 is located in a front facing position and will be retained therein for a tool interchange operation. To release the magazine 226, the solenoid 441 is deenergized whereupon the valve 440 operates to interrupt the supply of pressure fluid to the chamber 293 in the shot bolt cylinder 295 and to connect the chamber to the return line 384. Thereupon, the spring 299 is operative to move the piston 296 downwardly relative to the cylinder 295, as viewed in FIG. 2, or leftwardly, as viewed in FIG. 5. The downward movement of the piston will operate to retract the shot bolt 297 thereby releasing the magazine 226.

To operate the tool change arm 227 in a tool change operation, the grips 229 and 231 are first moved outwardly of the housing 334 into engagement with a tool presented by the magazine 226 and the tool presented by the spindle 215. To effect the outward movement of the grips 229 and 231 into tool engaging position, the chamber 341 of the grip actuator 340 is supplied with pressure fluid to effect outward movement of the two pistons 338 and 339, and simultaneously therewith, connect both ends of the cylinder 340 to the return line 384. To this end, a solenoid 446 associated with the valve 445 is energized and effects the operation of a valve 445 to direct pressure fluid obtained from the main supply line 383 to the chamber 341 of the grip actuator 325. Pressure fluid supplied to the chamber 341 will effect movement of the pistons 338 and 339 from their centered position in the cylinder 340, that they occupy as depicted in FIG. 4, outwardly towards the ends of the cylinder thereby moving the grips 229 and 231 outwardly of the housing 334 into extended tool engaging positions. Exhaust fluid from the ends of the cylinder 340 will be returned to the reservoir via the lines 352 and 352A, the common line 351A and the drilled passage 351, the manifold chamber 346, the line 343, and the valve 445. The valve 445 will operate to direct the exhaust fluid to the main return line 384 with the exhaust fluid flowing through a flow regulating valve 450 which is set at a predetermined setting to establish the rate of movement of the grips. With the grips 229 and 231 in an extended position, the cam 363, moving with the piston rod 337, will be moved into a position to actuate the limit switch 362. Actuation of the switch 362 operates to indicate in the electrical control circuit that the grips are in extended position.

After the arm 227 has been moved outwardly to its extended position to extract the tools from the magazine and from the spindle, and prior to the rotation of the arm in a tool interchanging movement, the grips 229 and 231 carrying the tools will be retracted. To effect the retraction of the grips, the solenoid 446 is deenergized and a solenoid 452 associated with the valve 445 is energized. With the solenoid 452 energized, the valve 445 is operated so that it directs the pressure fluid from the supply line 383 into the line 343. From the line 343, the pressure fluid flows in the manifold chamber 346 and thence into the drilled passage 351 from whence it flows into the lines 352 and 352A and then into both ends of the cylinder 340. Pressure fluid supplied to the ends of the cylinder 340 will effect the inward movement of the pistons 338 and 339 to return them to a central position within the cylinder 340. With the pistons 338 and 339 returned to the centered position within the cylinder 340, as shown in FIG. 4, the grips 229 and 231 will be moved to a retracted position. With the grips 229 and 231 in retracted position, the cam 363 will have been moved into position to actuate the limit switch 361.

Operation of the actuator 320 to effect the extension or retraction of the arm 227 is under the control of a valve 455. To effect the operation of the actuator 320 for moving the arm 227 to an extended position, a solenoid 456 associated with the valve 455 is energized. With the solenoid 456 energized, the valve 455 is operated to direct pressure fluid from the main supply line 383 into a chamber 458 at the right end of the cylinder 328. Pressure fluid supplied to the chamber 458 will effect the outward movement of the arm 227 away from the front face of the column 202 to an extended position, and in this movement, the arm 227 operates to withdraw the selected tool in the ready position at the tool change station 255 from the magazine turret and also to withdraw the previously used tool from the spindle 215. Exhaust fluid from a chamber 459 at the opposite or left end of the cylinder 328 will, by operation of the valve 455, be directed into the return line 384 with the return fluid flowing through a flow control valve 462 which regulates the rate of flow of the return fluid through the valve thereby regulating the rate at which the arm is moved. To retract the arm 227, the solenoid 456 is deenergized and a solenoid 457 associated with the valve 455 is energized thereby effecting the operation of the valve 455 for directing pressure fluid from the line 383 into the chamber 459 at the left end of the cylinder 328. Pressure fluid to the left end of the cylinder 328 operates the actuator 320 to effect the retraction of the arm.

The retracted or extended position of the arm 227 is indicated in the electrical control system by two switches 353 and 354, respectively. When the arm 227 is in a retracted position, a circular cam 355 secured on the rod 323 is in position to engage the actuating arm of the limit switch 353 thereby actuating the switch and indicating in the control system that the arm 227 is in retracted position. On the other hand, when the arm 227 has been moved to an extended position, the cam 355 will then be moved into a position where it engages the actuating arm of the limit switch 354 which operates to indicate in the control system that the arm is in full extended position.

The rotation of the arm 227 for effecting a tool interchange is accomplished by the operation of the motor 330 which is under the control of a solenoid actuated valve 465. To operate the motor 330 for effecting a 180° rotation of the arm, a solenoid 466 associated with the valve 465 is energized to operate the valve for directing pressure fluid obtained from the main supply line 383 to an inlet port 467 of the motor 330. Pressure fluid supplied to the motor 330 via the port 467 will operate the motor so that it rotates the arm 227 in a clockwise rotational movement, as viewed in FIG. 1, to effect an interchange of tools. Exhaust fluid from the motor 330 will flow from the motor via an outlet port 468 and by the operation of the valve 465 is directed into the return line 384 with the exhaust fluid flowing through a regulating valve 470. The regulating valve operates to regulate the rate of flow of the return fluid thereby regulating the rate at which the motor 330 will operate. To stop the rotation of the arm 227, the solenoid 466 is deenergized so that the valve 465 is operated to interrupt the flow of pressure fluid to the motor 330 and also to block the flow of exhaust fluid through the valve so that the motor is hydraulically locked in a stopped position, thereby maintaining the arm in a horizontal position.

When the arm is initially rotated 180° from the position it occupies in FIG. 1, wherein the grip 229 is positioned adjacent the spindle and the grip 231 is positioned adjacent the magazine, the cam plate 358 rotating with the output shaft 332 of the motor is angularly rotated and a cam 359 thereon is moved out of engagement with the actuating arm of the limit switch 356 to release the switch. When the arm 227 has been rotated 180° in a tool interchange movement, another cam 360, secured to the periphery of the cam plate 358 and disposed thereon diametrically opposite the cam 359, is moved into engagement with the actuating arm of the limit switch 356 and operates the switch to effect the deenergization of the solenoid 466 and thereby stop the operation of the motor 330. On the next tool change cycle of operation, wherein the arm is rotated in a clockwise direction another 180° to return the arm to the position shown in FIG. 1, the cam plate 358 rotating with the output shaft of the motor 330 will move the cam 360 out of engagement with the actuating arm of the limit switch 356 thereby releasing the limit switch 356 so that upon subsequent actuation by the cam 359 it will be operative to stop the operation of the motor 330 when the arm 227 is again in a tool interchange position. Thus, actuation of the switch 356 by either the cam 359 or the cam 360 will effect the stopping of the motor 330 so that the arm 227 will be in a horizontal position.

*Electrical circuit*

Figure 6:
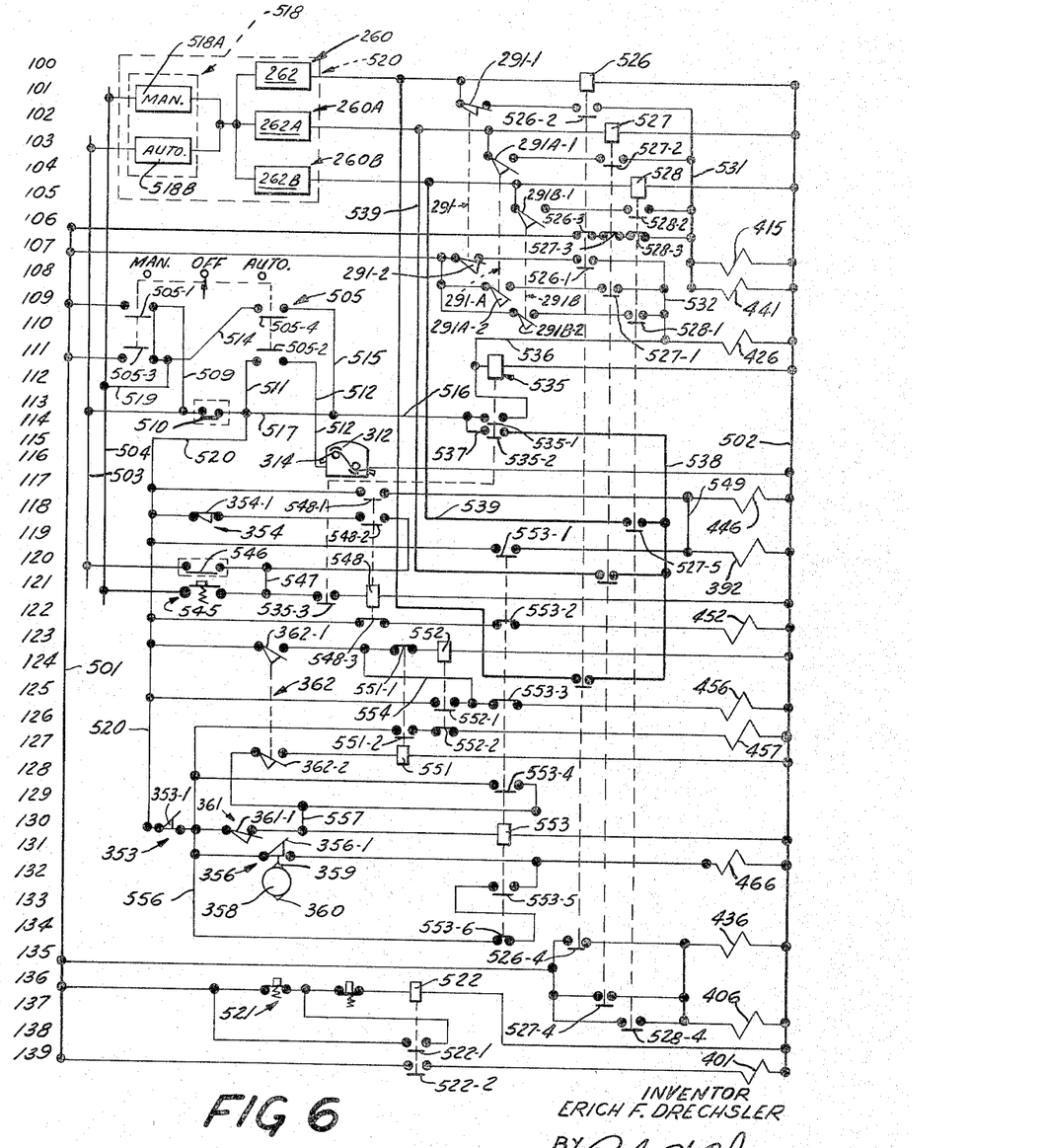

The electrical control circuit for controlling the operation of the machine is shown in the wiring diagrams illustrated in FIG. 6. In this diagram, each of the electrical components is shown connected in conductors or lines that are, in turn, connected across vertical power lines 501, 502, 503 and 504, with each of the horizontal lines being identified successively by numerals 100 to 139 inclusive, so that the components may be readily located. The contacts of the various relays are identified by the same reference numerals as their associated relay coils with a numeral suffix added for the purpose of distinguishing each individual contact from the other.

The power lines 501 and 502 are energized from a source (not shown) in the usual well-known manner. On the other hand, the lines 503 and 504 are energized by connecting them to the lines 501 and 502. This is accomplished by manually operating a mode selection switch 505 to one of its three positions, depending upon whether the machine is to be operated under manual control or is to be automatically controlled from signals obtained from the tape 314.

As previously mentioned, the machine may be operated entirely automatically from recorded data contained on a record, such as the magnetic or punched tape 314, which is read by the tape reader 312 that is contained within the console 311, FIG. 1, and shown diagrammatically in FIG. 6. If the machine is to be placed under the control of signals received from such recorded data, the manually operated mode selector switch 505 is positioned to "AUTO" to move a contact bar 505-1 upwardly and a companion contact bar 505-2 downwardly. With the mode selector switch 505 in "AUTO" position, the electrical control circuit is conditioned for operation in response to signals received from the record. To this end, the contact bars 505-1 and 505-2 are moved upwardly and downwardly, respectively, to closed positions and a circuit is completed from the energized line 501 along horizontal line 109 through the closed contact bar 505-1, line 509. The energized circuit continues from the line 509 to horizontal line 113 and thence through a normally closed automatic contact 510 to a line 511 which is connected to a terminal associated with the now closed contact bar 505-2. The circuit continues through the now closed contact bar 505-2 to the opposite terminal and thence to a line 512 which is connected to the tape reader 312 with the circuit being completed along line 116 to the power line 502. The energized tape reader 312 functions to produce the appropriate electrical signals in response to the information contained on the tape 314 for fully automatic operation of the machine. On the other hand, if the various functions in the machine are to be initiated by the manual operation of switches, the mode selector switch 505 is actuated to "MAN" position thereby moving the contact bars 505-3 and 505-4 from their neutral position downwardly and upwardly, respectively, into bridging engagement with their associated contact terminals. With the mode selector switch 505 in "MAN" position, a circuit is established from the power line 501 along horizontal line 111 through the now closed contact bar 505-3, a connected line 514, the now closed contact bar 505-4 to a connected line 515. The circuit continues from the line 515 and branches rightwardly and leftwardly through connected conductors 516 and 517 of line 113. From the conductor 517, the circuit continues to a connected conductor 520 for effecting the operations of the electrical components connected thereto.

The control system includes an electrical tool designation circuit 518 that operates in conjunction with the tool reading heads 260, 260A and 260B. The designation circuit 518 includes a plurality of manually operated switches represented by the block 518A. The number of the manual switches provided will be equal in number to the number of digits of the binary system utilized for tool identification which, in this particular instance, is ten digits. The tool designation circuit 518 also includes a plurality of automatic contacts represented by the block 518B. The number of automatic contacts are likewise equal in number to the number of digits of the binary system provided for tool identification. Thus, the number of the desired tool may be indicated in the electrical control system, either by operating the manual switches [not shown] represented by the block 518A, or it may be done automatically in response to signals from recorded data which effects the operation of the automatic contacts [not shown] represented by the block 518B. It is not believed necessary to describe and illustrate in detail the manual switches or the automatic contacts of the tool designation circuit since this circuit per se is not novel. However, for a detailed description of such circuit arrangement, reference may be had to a patent Re. 25,737 issued to Wallace E. Brainard et al.

If the machine is to be manually controlled, a circuit to energize the manual switches [not shown] of the manual switch circuit 518A of the tool designation circuit 518 will be established from the closed contact bar 505-3 and thence along a connected conductor 519 to energize the vertical line 504. From the line 504, the circuit continues along horizontal line 101 to each of the manual switches [not shown] of the manual switch circuit 518A. On the other hand, with the machine under the control of recorded data, the mode selector switch 505 will have been actuated to the "AUTO" position and its associated contact 505-3 in line 111 will be opened so that a circuit cannot be completed to the manual switch circuit 518A. However, with the selector switch 505 in "AUTO" position, the contact bar 505-1 will be in a closed position thereby completing an energizing circuit to the vertical conductor 503 via the connecting line 509 and thence along line 113. From the energized line 503 the circuit continues along line 103 to the automatic contact circuit 518B.

It will be recalled that each of the reading heads 260, 260A and 260B have been previously described as having ten movable fingers 261, 261A and 261B, respectively, which engage the binary coding on the collars of each of the tools stored in the respective turrets as these tools move in their circular path past the associated reading head. Each of the fingers associated with the individual reading heads is connected to operate a switch [not shown] whenever it is shifted by the presence of a coded ring in the bit position on the collar of a tool with which the individual fingers are in contact. Since ten digits of the binary number system are depicted for identifying the tools 216 in the present illustration, the number of fingers and switches actuated thereby will be ten for each reading head and the switches [not shown] are operably contained within the housings 262, 262A and 262B represented diagrammatically by the blocks 262, 262A and 262B in FIG. 6. The tool designation circuit 518 together with the reading head circuits 260, 260A and 260B constitutes a coincidence circuit which is indicated in FIG. 6 within the broken rectangular outline and identified by the reference numeral 520.

Assuming that the machine is being operated in automatic mode, the selector switch 505 will have been positioned into the "AUTO" position and the associated contact bars 505–1 and 505–2 will have been moved to closed positions thereby completing a circuit to the automatic contact circuit 518B. By means of signals obtained from the recorded data, the automatic contacts in each tool designating circuit will be closed in appropriate combinations to indicate the next desired tool to be selected for utilization in the spindle. When the desired tool is identified by one of the reading heads 260, 260A or 260B, the associated switches [not shown] of the reading head will be actuated in a corresponding relationship to the automatic contacts [not shown] of the automatic circuit 518B and coincidence is thereupon obtained between the automatic contacts of the circuit 518B and the switches [not shown] of the reading head associated with the particular turret in which the selected tool is stored. For the purpose of this description, it will be also assumed that the desired tool for the next succeeding work operation is stored in the turret 243. Under this condition, signals obtained from the record will actuate the automatic contacts [not shown] in the automatic circuit 518B in the proper combination to indicate the desired tool which is to be selected. Prior to a tool selection operation, the magazine motor 256 will be made operative by energizing the solenoid 401 associated with the motor control valve 397. This is accomplished manually by the operator momentarily depressing a start button switch 521 in line 136 thereby completing a circuit from the energized conductor 501 to a coil of a start relay 522 in line 136 and thence to the conductor 502. With the relay 522 energized, it operates to move a pair of normally open contact bars 522–1 and 522–2 to closed positions. With the contact bar 522–1 in a closed position, a maintaining circuit is established around the start switch 521 to retain the relay 522 energized when the start switch 521 is released. With the contact bar 522–2 moved to a closed position, a circuit along line 139 is completed to effect the energization of the solenoid 401. As previously described, with the solenoid 401 energized, it actuates the valve 397, FIG. 5, to direct pressure fluid to the motor 256 to operate the motor, With the motor 256 operating and with the selector switch 505 in "AUTO" position and with the tape reader 312 energized, as previously described, a signal is provided to actuate the contacts [not shown] in the automatic circuit 518B in the proper combination to designate the desired tool to be selected for the succeeding operation. The sensing heads 260, 260A and 260B will be in advanced tool sensing position, but since the desired tool assumed to be stored in the turret 243 is not in the selected tool position 263B, the fingers 261B, and therefore the switches [not shown] of the sensing head 260B, will not be actuated in the proper combination to coincide with the actuated automatic contacts [not shown] and a circuit from the automatic circuit 518B through the sensing head 260B will not be completed. With this condition existing, relays 526, 527 and 528, in lines 100, 102 and 104, respectively, associated with the sensing heads 260, 260A and 260B, respectively, are deenergized. As a result, the various contact bars associated with the relays are all in their normal positions.

Thus, contact bars 526–1, 527–1 and 528–1, in lines 107, 108 and 109, are all in their normally open positions, and as a result, a circuit cannot be completed to the solenoid 426, line 110, and it is deenergized. With the solenoid 426 deenergized, its associated valve 425 is operative to connect the sensing head cylinders 421, 421A and 421B to the return line 384 and the internal spring mechanism operates to maintain the sensing heads 260, 260A and 260B in advanced tool sensing positions.

At this time, the turret 242, as shown in FIGS. 1 and 3, is in front facing position and therefore its associated limit switch 291 is actuated and its normally open contact bars 291–1 and 291–2, lines 101 and 107, respectively, are in closed positions. However, the actuation of the switch 291 has no effect at this time since the relay 526 is deenergized and therefore its associated contact bars 526–1 and 526–2 are in normal open positions.

With the relays 526, 527 and 528 deenergized, their associated normally closed contact bars 526–3, 527–3 and 528–3, in line 106, are all in closed position and operate to complete a circuit along line 106 to a connected vertical conductor 531 which, in turn, is connected to solenoids 415 and 441, in lines 107 and 108. Thus, the solenoids 415 and 441 are energized and effect the operation of their associated valves 414 and 440. As previously described, energization of the solenoid 440 effects the operation of the valve 441 to move the shot bolt 297 into engagement with the magazine frame 240 to prevent its rotation. On the other hand, with the solenoid 415 energized, it effects the operation of the valve 414 for effecting a release of the magazine clutch 287 thereby interrupting the drive connection between the motor 256 and the magazine frame 240.

Also, contact bars 526–4, 527–4 and 528–4, lines 134, 136 and 137, of the deenergized relays 526, 527 and 528, respectively, are all in their normal open positions. With this condition obtained, circuits to solenoid 436, in line 134, and the solenoid 406, in line 137, are interrupted and these solenoids are deenergized. With the solenoid 436 deenergized, its associated valve 435 operates to connect the cylinders 271, 271A and 271B of the turret shot bolt mechanisms 270, 270A and 270B, respectively, to the return line 384, as previously described. Thus, the shot bolts 272, 272A and 272B are retracted thereby releasing the associated turrets 242, 243 and 244, respectively.

With the solenoid 406 deenergized, the valve 405 is operated, as previously described, to supply pressure fluid to the turret clutch mechanism 286 to thereby effect a driving connection between its driving and driven elements. This establishes a drive from the motor 256 to the turrets, as previously described, and the turrets 242, 243 and 244 are simultaneously rotated in a tool identification selection movement.

When the desired tool is moved into position so that the coding rings 259 thereon are identified by the fingers 261B of the sensing head 260B, coincidence will be obtained between the automatic circuit 518B and the sensing head circuit 260A and an energizing circuit along line 102 will be established. As a result, the relay 527 will be energized. With the relay 527 energized, it operates to move its associated normally open contact bars 527–1, 527–2 and 527–4 to closed positions, and to move its normally closed contact bar 527–3 to an open position. With the contact bar 527-4, line 136, moved to a closed position, a circuit from the energized conductor 501 is completed along lines 135 and 137 to the solenoids 406 and 436. With the solenoid 406 energized, its associated valve 405 will operate to interrupt the supply of pressure fluid to the turret clutch mechanism 287 and the clutch mechanism is released thereby interrupting the power drive to the turrets. Simultaneously therewith, the energized solenoid 436 will effect the operation of the valve 435 to direct pressure fluid to the shot bolt mechanisms 270, 270A and 270B to operate the mechanisms for moving the shot bolts 272, 272A and 272B into engagement with the turrets 242, 243 and 244, respectively, thereby stopping the rotation of the turrets and the selected tool in the turret 243 will be located in the selected tool position 263A of the turret 243.

As previously mentioned, with the relay 527 energized, the associated contact bars 527-1 and 527-2, lines 108 and 103, respectively, are now in closed positions, and at this time, they do not affect the control system, but are conditioned for a subsequent control operation. However, the contact bar 527-3, line 106, having been moved to an open position by the energization of the relay 527, operates to interrupt the circuit along line 106, thereby effecting the deenergization of the solenoids 415 and 441 associated with the valves 414 and 440, respectively. With the solenoid 441 deenergized, the valve 440 operates to stop the flow of pressure fluid to the magazine shot bolt mechanism 294. As a result, the shot bolt 297 is retracted thereby releasing the magazine frame 240. Simultaneously therewith, the valve 440 operates, by reason of its solenoid 441 being deenergized, to direct pressure fluid to the clutch mechanism 286. Thereupon the magazine clutch mechanism 286 is operated to establish a drive connection between the motor 256 and the gear 283 to thereby effect the rotation of the magazine frame 240 for moving the turret with the selected tool into the front facing position.

As the magazine frame 240 rotates, the various turrets will be moved into front facing position. When the turret 243 is moved into the front facing position, the switch 291A will be actuated. Actuation of the switch 291A will move its associated contact bars 291A-1 and 291A-2, lines 103 and 108, respectively, to closed positions. With this condition obtained, a circuit is completed from the energized conductor of line 102 to the conductor line 103 and thence through the now closed contact bar 291A-1 and the now closed contact bar 527-2 to the vertical conductor 531. The circuit continues from the vertical conductor 531 to the solenoids 415 and 441 to effect the energization of these solenoids. With the solenoid 415 energized, its associated valve 414 is operated to interrupt the flow of pressure fluid to the clutch mechanism 286 and its internal mechanism effects a release of the clutch to interrupt the drive from the motor 256 to the magazine frame 240. Simultaneously therewith, the energized solenoid 441 effects the operation of its associated valve 440 to direct pressure fluid to the shot bolt mechanism 294 thereby moving the shot bolt 297 into engagement in the block 298A that is associated with the turret 243. With the shot bolt 297 in engagement in the block 298A, rotation of the magazine 226 is stopped and the turret 243 is located in front facing position, and the selected tool in the selected tool position 263A of the turret 243 will be located in the ready position at the tool change station 255.

With the relay 527 energized and with the switch 291A actuated, associated contact bars 527-1 and 291A-2, respectively, in line 108, are both in closed positions. Thus, a circuit from the energized conductor 501 is established through the connected conductors of lines 107 and 108, through the now closed contact bars 291A-2 and 527-1 to a vertical conductor 532. The circuit continues from the vertical conductor 532 to the conductor in line 110 and thence through the solenoid 426 to the conductor 502. With the solenoid 426 energized, it operates to effect the operation of its associated valve 425 and pressure fluid is directed to the actuators 265, 265A and 265B of the sensing heads 260, 260A and 260B, respectively, to effect the movement of the sensing heads to retracted disengaged positions.

Since the relay 527 is energized through a circuit which is established by the coincidence between the actuated switches [not shown] of the sensing head 260A and the automatic contacts [not shown] of the automatic circuit 518B, the retraction of the sensing head 260A would normally interrupt the energizing circuit to the relay 527. With the relay deenergized, a tool selecting operation would again be initiated prior to a tool interchange operation. To prevent this and to condition the control circuit for the operation of the tool change arm 227, a holding relay 535, in line 111, is energized. To this end, a circuit is completed from the vertical conductor 532 through a conductor 536, of line 110, to the conductor in line 111, then through the coil of the relay 535 and thence to the conductor 502. With the relay 535 energized, it operates to move three associated normally open contact bars 535-1, 535-2 and 535-3, in lines 113, 114 and 121, respectively, to closed positions. With the contact bar 535-1 in a closed position, a circuit is completed to maintain the relay energized upon the retraction of the sensing heads and also to maintain the relay 527 energized. Thus, a circuit from the conductor 501 is completed along the conductor on line 113, through the previously closed automatic contact bar 510, through conductors 517 and 516, the now closed contact bar 535-1 to the conductor of line 111 and thence through the coil of the relay 535 to thereby maintain the relay energized.

A circuit is also completed from the energized conductor 516 to a conductor 537 and thence through the now closed contact bar 535-2 of the relay 535 to a conductor 538. From the conductor 538, the circuit continues through the now closed contact bar 527-5, a line 120, a connected conductor 539 to line 102 and thence rightwardly through the coil of the relay 527 to maintain the relay energized after the sensing head 260A has been retracted. Thus, with the sensing heads 260, 260A and 260B returned to their retracted positions, the solenoids 415, 441, 426, 436 and 406 are all retained energized to maintain the turret shot bolts 272, 272A and 272B in locking engagement with the turrets and also to maintain the magazine shot bolt 297 in locking engagement with the magazine frame 240 during a subsequent tool interchange operation of the arm 227.

After the selected tool has been located and locked in the ready position at the tool change station 255, the arm 227 will be operated in a tool interchange movement. The operation of the arm 227 in a tool interchange operation may be initiated manually by actuating a tool change cycle start button 545, or the tool change cycle may be initiated automatically by a signal from the tape 314. Assuming that the tool change is initiated automatically, an automatic contact 546, in line 120, will be momentarily moved to a closed position. This will complete a circuit along line 120 to a connecting vertical conductor 547. The circuit continues from the vertical conductor 547 to line 121 and thence through the now closed contact bar 535-3 of the relay 535 and through the coil of a relay 548 to the energized conductor 502 thereby effecting the energization of the relay 548. With the relay 548 energized, it operates to move associated contact bars 548-1 and 548-2 in lines 117 and 118 to closed positions. Simultaneously therewith, a normally closed contact bar 548-3, in line 122, is moved to an open position. The movement of the contact bar 548-2 to a closed position, in cooperation with the closed contact bar 354-1 of the released switch 354, serves to complete a maintaining circuit for retaining the relay 548 energized upon the subsequent opening of the automatic contact bar 546.

The movement of the contact bar 548-3, in line 122, to an open position serves to interrupt the circuit along line 122 thereby effecting the deenergization of the solenoid 452 associated with the valve 445. Simultaneously therewith, the solenoid 446 also associated with the valve 445 is energized. This is effected upon the movement of the contact bar 548–1 to a closed position which operates to complete the circuit along line 117 to energize the solenoid 446. With the solenoid 446 energized, the valve 445 is operated to direct pressure fluid to the chamber 345 in the manifold 341 and thereby effect movement of the grips 229 and 231 outwardly of the housing 334 to an extended tool engaging position.

Simultaneously with the energization of the grip extend solenoid 446, the solenoid 392 associated with the spindle mechanism control valve 391 is also energized. This is accomplished by means of a conductor 549 interconnected between the lines 117 and 119. Thus, a circuit for effecting the energization of the solenoid 392 is completed from the energized line 117 via the conductor 549 to line 119 and thence through the solenoid 392 to energize the solenoid. Thus, whenever the grip extend solenoid 446 is energized, the solenoid 392 is also energized. With the solenoid 392 energized, the spindle mechanism 388 will be operated, as previously described, to apply the spindle brake mechanism 388A and release the collet clamp mechanism 388B thereby retaining the spindle 215 in an angular predetermined position and to release the tool in the spindle. As the grips are moved to an extended position, the switch 361, line 130, is released and its contact bar 361–1 moves to an open position, but at this time, it has no effect on the control system.

With the grips 229 and 231 positioned into extended tool engaging positions, the switch 362 will be actuated and its associated contact bars 362–1 and 362–2 in lines 123 and 127, will be moved to closed positions. The closing of the contact bar 362–2 has no effect at this time. On the other hand, with the contact bar 362–1 in a closed positon, a circuit is completed from the energized conductor 520 along line 123, through the now closed contact bar 551–1 of a deenergized relay 551 to the coil of arm extend relay 552 and thence to energized conductor 502. With the relay 552 energized, it operates to move a normally open contact bar 552–1, in line 125, to a closed position and a normally closed contact bar 552–2, line 126, to an open position. With the contact bar 552–1 in a closed position, a circuit is completed along line 125 through the now closed contact bar 552–1 and a normally closed contact bar 553–3 of a deenergized arm rotate relay 553 to energize the solenoid 456 associated with the valve 455. As a result, the arm 227 will be moved outwardly to an extended position withdrawing the selected tool from the magazine and the previously used tool from the spindle 215. A maintaining circuit is also established from line 125 to line 123 via a connecting conductor 554 to retain the relay 552 energized upon the subsequent retraction of the grips 229 and 231. As the arm 227 is moved from its retracted position to its extended position, the switch 353, line 130, is released and its contact bar 353–1 is moved to a closed position. However, the movement of the contact bar 353–1 to a closed position has no control effect at this time because the grips are in extended position and, therefore, the switch 361, line 130, is released and its contact bar 361–1 is in an open position. Likewise, switch 356, line 131, is held open by the cam 359.

With the arm 227 moved to its extended position, the cam 355 will actuate the switch 354 moving the contact bar 354–1 thereof to open position. As a result, the maintaining circuit completed through the contact bar 354–1 to the coil of the relay 548 energized is interrupted and the relay is deenergized. With the relay 548 deenergized, its associated contact bars 548–1 and 548–2, lines 117 and 118, are moved to their normally open positions. With the contact bar 548–1 in its open position, the solenoid 446 associated with the valve 445 is deenergized and thereby conditions the valve to allow the grips to be retracted. Likewise, the solenoid 392 associated with the valve 391 is deenergized, and as a result, the spindle brake mechanism 388A and the collet mechanism 388B are released. However, this condition will not interfere with a tool change cycle of operation since the previously used tool has now been withdrawn from the spindle 215.

With the relay 548 deenergized, its associated contact bar 548–3, line 122, is returned to its normally closed position. A circuit is now completed from the energized conductor 520 along line 122, through the now closed contact bar 548–3 and a normally closed contact bar 553–2 to the solenoid 452 to energize the solenoid. The solenoid 452, upon being energized, effects the operation of the valve 445 so that the valve directs pressure fluid to the chamber 346 in the manifold 344 to effect retraction of the grips 229 and 231, as previously described. Thus, the grips carrying the selected tool and the previously used tool are retracted to move the tools into a position wherein they will not strike any other tool carried by the turret 243 upon the subsequent rotation of the arm 227.

As the grips are retracted, the switch 362 is released and its associated contact bars 362–1 and 362–2, lines 123 and 127, are returned to their normally open positions. This has no effect on the control system at this time. With the grips fully retracted, the switch 361 will be actuated and its contact bar 361–1 will be moved to a closed position. Since the arm 227 is in extended position at this time, the switch 353 will be released and its contact bar 353–1 will be in a closed position. As a result, a circuit is completed from the energized conductor 520 through the now closed contact bars 353–1 and 361–1 to energize the coil of the relay 553 in line 130. With the relay 553 energized, it operates to move its associated contact bars 553–1 to 553–6 from the normal positions that they occupy as depicted in FIG. 6. However, the contact bar 553–1, in line 119, is provided with a time delay mechanism which operates to delay its movement to a closed position until a preset time interval has expired. On the other hand, the contact bar 553–2, line 122, is a normally closed contact bar and is also provided with a time delay mechanism which operates to delay its movement to an open position until a preset time interval has expired. Similarly, the contact bar 553–6, line 134, is also a normally closed contact bar that is provided with a time delay mechanism which operates to delay its movement to an open position until after a preset time interval has expired. Thus, even though the relay 553 is energized, its associated normally closed time-to-open contact bar 553–2, line 122, will remain closed for a set time thereby maintaining the grip retract solenoid 452 energized. Thus, the grips are positively maintained in retracted position during the subsequent rotation of the arm 227.

With the relay 553 energized, its contact bar 553–5, line 132, is immediately moved to a closed position, while the normally closed time-to-open contact bar 553–6, line 134, remains in a closed position. With this condition obtained, a circuit is completed from the energized vertical conductor 556 through the normally closed time-to-open bar 553–6 and the now closed contact bar 553–5 to the solenoid 466 to energize the solenoid. With the solenoid 466 energized it effects the operation of its associated valve 465 for directing pressure fluid to the motor 330 to rotate the arm 227. As the arm 227 starts to rotate, the cam 359 moves out of engagement with the switch 356 to release the switch. Thereupon the contact bar 356–1, line 131, closes and completes a maintaining circuit to retain the solenoid 466 energized. At this time, the preset time interval established for the contact bar 553–6 expires and the contact bar 553–6 moves to an open position.

When the arm 227 has been rotated 180° in a tool interchange movement wherein the grip 229 with the selected tool is located adjacent the spindle 215 and the grip 231 with the previously used tool is positioned adjacent the magazine, the cam 360 will have been moved into position to actuate the switch 356 and move its associated contact bar 356–1 to open position. Since the contact bar 553–6, line 134, is now in open position, the movement of the contact bar 356–1 to an open position will serve to effect the deenergization of the solenoid 466 thereby stopping the motor 330 with the arm 227 being located in the horizontal plane as described.

Immediately upon the deenergization of the solenoid 466, the preset time interval established for the contact bars 553–1 and 553–2, lines 119 and 122, expires. Thus, the contact bar 553–2 will move to an open position and thereby effect the deenergization of the grip retracted solenoid 452. Simultaneously, the contact bar 553–1 moves to a closed position and completes the circuit along line 119 to effect the energization of both the solenoid 392 for effecting the operation of the spindle mechanism 388 releasing the collet mechanism 388B and actuating the brake mechanism 388A; and also to energize the solenoid grip extend solenoid 446. Thus, the grips are again moved to an extended position to position the selected tool in the grip 229 in axial alignment with the spindle 215 and to align the previously used tool in the grips 231 with the storage socket of the turret 243 from which the selected tool was withdrawn.

As the grips are moved to extended positions, the switch 361 is released, but this does not affect the relay 553. At this time, the relay 553 is maintained energized through its own contact bar 553–4, line 128, which is now in a closed position. Thus, a maintaining circuit is completed from the conductor 556 along line 128 through the now closed contact bar 553–4, line 129, a connecting vertical conductor 557 and line 130, to the relay 553.

With the grips 229 and 231 again in extended position, the switch 362 will again be actuated and its associated contact bars 362–1 and 362–2, lines 123 and 127, are moved to closed positions. With the contact bar 362–2 in a closed position, it operates to complete a circuit from the energized conductor of line 129 to energize the relay 551. With the relay 551 energized, it operates to move its associated contact bar 551–1, in line 123, to an open position. As a result, the relay 552 will be deenergized and the associated contact bars 552–1 and 552–2, lines 125 and 126, are returned to their normally open and closed positions respectively. Simultaneously, with the movement of the contact bar 551–1 to an open position, another contact bar 551–2, line 126, associated with the now energized relay 551 is moved to a closed position. Thus, a circuit from the energized vertical conductor 556 is completed along line 126 through the now closed contact bars 551–2 and 552–2 to the arm retract solenoid 457 to energize the solenoid. With the solenoid 457 energized, the valve 455 is operated to direct pressure fluid to the chamber 459 of the cylinder 328. As a result, the arm 227 is moved inwardly to a retracted position as previously described, thereby inserting the selected tool in the spindle 215 and the previously used tool into the socket of the turret 243.

With the arm 227 in full retracted position, the switch 353, line 130, will again be actuated thereby moving its contact bar 353–1 to an open position. With the contact bar 353–1 moved to an open position, the circuit through the contact bar is interrupted and the vertical conductor 556 is deenergized. Thus, relays 551 and 553, as well as the solenoids 457 and 466, are deenergized and conditioned for the next tool interchange cycle of operation.

With the relay 553 deenergized, its associated contact bars will all be returned to their normal positions, depicted in FIG. 6. Thus, the contact bars 553–1 and 553–2 are returned to their open and closed positions respectively. With the contact bar 553–1 in open position, the grip extend solenoid 446 and the spindle mechanism solenoid 392 are both deenergized. The valve 391 with which the solenoid 392 is associated, is therefore operated to release the spindle brake mechanism 388A and operate the collet clamp mechanism 388B to clamp the selected tool in the spindle 215.

With the contact bar 553–2, line 122, returned to its normally closed position, a circuit will be completed along the line 122, through the now closed contact bar 548–3 of the deenergized relay 548, the now closed contact bar 553–2 to the solenoid 452 to energize the solenoid. The valve 445 with which the solenoid 452 is associated will be operated to effect the retraction of the grips 229 and 231 leaving the selected tool in the spindle 215 and the previously used tool in storage in the turret 243.

A complete cycle of tool selection and tool interchange has been completed and the spindle 215 with the selected tool will be operated in a work operation. As the spindle 215 is performing a work operation, another tool selecting operation will be initiated to locate a different designated tool at the tool change station, which will be used in a subsequent work operation.

From the foregoing detailed description of the illustrative embodiment of the invention set forth herein to exemplify the present invention, it will be apparent that there has been provided an improved tool change mechanism in combination with a novel tool storage means.

Although the illustrative embodiment of the invention has been described in considerable detail for the purpose of disclosing a practical operative structure whereby the invention may be practiced advantageously, it is to be understood that the particular apparatus described is intended to be illustrative only and that the various novel characteristics of the invention may be incorporated in other structural forms without departing from the spirit and scope of the invention as described in the sub-joined claims.

The principles of this invention having now been fully explained in connection with the foregoing description, I hereby claim as my invention:

1. In a tool storage apparatus for storing tools that are to be employed in the operating station of a machine tool which is provided with a tool transfer means for transferring tools between the storage apparatus and the operating station;

a movable magazine;
    a tool change station;
    a plurality of tool storage members carried by said magazine for independent movement relative to said magazine in a tool selecting operation as well as for movement with said magazine so that the movement of said magazine will move said tool storage members into said tool change station for locating a selected one of the storage members at the tool change station, each of said storage members carrying a plurality of tools for use in the operating station;
    a tool ready station located at the tool change station wherein selected tools are presented for withdrawal and transfer by the tool transfer means;
    means operable to actuate said magazine in its movement for locating said tool storage members at the tool change station selectively; and,
    means operable to move said tool storage members relative to said magazine in a tool selecting operation for positioning the selected tool so that the movement of said magazine containing the selected tool into the tool change station will locate the selected tool in said ready station for subsequent transfer to the operating station by the tool transfer means.

2. A tool storage apparatus according to claim 1 wherein said magazine is supported for rotary movement, said tool storage members are supported by said magazine for rotary movement relative to said magazine, and the tools are stored in said storage members in a manner that the rotary movement of said storage members relative to said magazine in cooperation with the rotary movement of said magazine will operate to locate a selected one of the tools stored in said storage members in said ready station at the tool change station.

3. A tool storage apparatus according to claim 1 wherein said means to actuate said magazine is operated in response to a tool being selected and located by the independent rotation of said tool storage members in a position wherein the subsequent rotation of the magazine will locate the storage member with the selected tool in said ready station at the tool change station.

4. A tool storage apparatus according to claim 1; including locking means actuated by the selection of any one of the tools stored in said tool storage members, said locking means being operable when actuated to engage at least one of the tool storage members to prevent the further movement of all of said storage members and in so doing locate the selected tool in a position where it will be moved into said ready station at the tool change station upon the subsequent movement of the magazine.

5. A tool storage apparatus according to claim 4; including locating means actuated in response to the arrival of a tool storage member with a selected tool at the tool change station, said locating means being operable when actuated to terminate the movement of said magazine so that it operates to locate the tool storage member with the selected tool in said ready station at the tool change station.

6. A tool storage apparatus according to claim 1 in which said tool storage members are moved simultaneously relative to said magazine in a tool selection operation and upon the selection of a tool in any one of the tool storage members, the movement of all of said storage members are terminated simultaneously.

7. A tool storage apparatus according to claim 1 including a source of power wherein; said means to move said tool storage members includes a drive transmission operably connected to drive all of said tool storage members simultaneously in a rotational tool selecting movement, said means to actuate said magazine includes a drive transmission operably connected to drive said magazine in a rotary movement for locating the storage member with the selected tool at the tool change station, and including a first clutch operable when actuated to connect said tool storage drive transmission to said source of power, and a second clutch operable when actuated to connect said magazine drive transmission to said source of power.

8. A tool storage apparatus according to claim 1 including;
- coding means on each of the tools stored in said storage members for identifying the tool;
- tool identifying means associated with each of said tool storage members in position to be actuated by said coding means for identifying the tools in the associated tool storage member;
- locating means responsive to the identification of the selected tool by said tool identifying means to terminate the movement of said tool storage members and to actuate said magazine moving means for locating the selected tool in said tool ready station at the tool change station.

9. A tool storage apparatus according to claim 8 in which the tool identifying and selecting means are carried by said magazine for bodily movement with said magazine as said magazine moves to effect the bodily movement of said tool storage members, each of said tool identifying and selecting means being also supported for movement between a retracted position and an advanced position relative to an associated storage member, said identifying and selecting means when in an advanced position being disposed in a position to read the identification on the tools as they are moved in their path of travel by the movement of said storage member for identifying the tools, whereby the said identifying and selecting means are maintained in co-operable relationship with their respective storage members irrespective of the position to which the storage members may be moved by the operation of said magazine.

No references cited.

RICHARD H. EANES, JR., *Primary Examiner.*